United States Patent [19]
Mayer

[11] 3,769,597
[45] Oct. 30, 1973

[54] PARAMETRIC DEVICE FOR MULTIPLYING FREQUENCIES

[76] Inventor: Ferdy Mayer, 18 rue Thiers, Grenoble, France

[22] Filed: Jan. 21, 1972

[21] Appl. No.: 219,746

[30] Foreign Application Priority Data

Jan. 22, 1971 France ...........................7102913

[52] U.S. Cl................... 328/160, 307/220, 307/295, 328/15, 331/16

[51] Int. Cl................................................. G06g 7/16

[58] Field of Search..................... 307/220, 225, 295; 328/15, 16, 38, 158, 160; 331/16

[56] References Cited

UNITED STATES PATENTS

| | | | |
|---|---|---|---|
| 3,217,267 | 11/1965 | Loposer | 331/16 |
| 3,286,191 | 11/1966 | Cornwell | 331/16 X |
| 3,551,826 | 12/1970 | Sepe | 328/160 |
| 3,588,732 | 6/1971 | Tollefson | 331/16 X |
| 3,673,391 | 6/1972 | Lougheed | 328/38 X |

*Primary Examiner*—Stanley D. Miller, Jr.
*Attorney*—Paul M. Craig, Jr. et al.

[57] ABSTRACT

The present invention relates to a device energized by two input frequencies which furnishes at the output a frequency whose numeric value is equal to the product of the numeric values of the input frequencies. It works by cooperation between a phase discriminator, a VCO-type oscillator and a variable-sequence divider which is automatically set in accordance with the state of an electronic counter which is excited by one of the two frequencies. This counter which is synchronized with a time base operates like an electronic frequency-meter adjusting the variable-sequence divider at the end of each counting interval. The basic multiplier circuit is also used to provide modified embodiments, one of which produces the square of an input frequency, another the inverse of an input frequency, the third the square root of an input frequency. Different applications of these circuits are presented for different problems of measuring physical quantities.

10 Claims, 8 Drawing Figures

PARAMETRIC DEVICE FOR MULTIPLYING FREQUENCIES

The present invention relates to a device for multiplying two input frequencies together, and specifically of the parametric type; in other words, a circuit furnishing an output frequency whose numeric value is equal to the product of the numeric values of two input frequencies, at a close constant. The present invention also relates to and is concerned with the application of a basic circuit to the generation of certain simple arithmetic functions, such as for example, the generation of a frequency equal to the square of the numeric value of a frequency, the generation of a frequency equal to the square root of the numeric value of a frequency, the generation of a frequency equal in the ratio to a frequency, and other analogous applications, as well as applications of these functions to either measuring or control installations.

The basic circuit comprises essentially a controlling or regulating device in the form of a closed loop providing connection from an output frequency to a first input frequency of a phase discriminator, this loop comprising a variable sequence divider which is adjusted at regular intervals by a time base according to the mean value of a second input frequency during the previous time interval which has just elapsed.

The present invention will now be explained in further detail with reference to the accompanying drawings, wherein.

Figure 1:
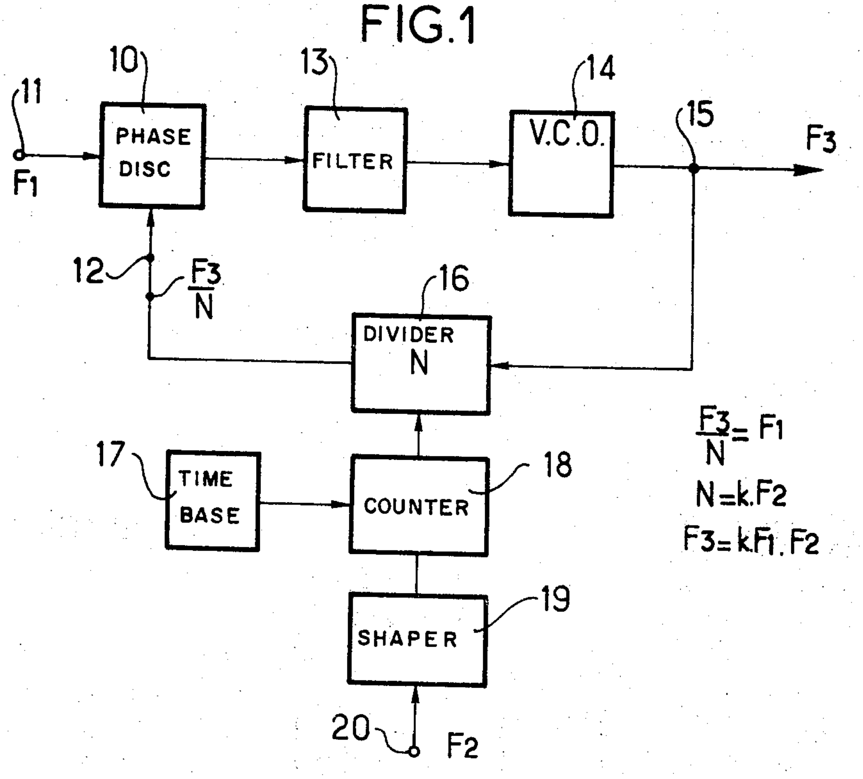
FIG. 1 is a schematic diagram of the basic circuit furnishing an output frequency whose numeric value is proportional to the product of two input frequencies.

The basic circuit illustrated in FIG. 1 comprises a phase discriminator 10 having two inputs 11 and 12. The first input 11 receives a frequency F1, and the second input 12 receives a frequency F3/N whose origin will be explained hereinafter. The phase discriminator 10 is connected through a suitable passband filter 13 to a variable frequency oscillator 14 regulated by the input voltage applied thereto from the output of filter 13; for example, the oscillator frequency may be adjusted by means of a diode having a variable capacity inserted in the oscillating circuit. The oscillator 14 furnishes on the output 15 thereof a frequency F3 which is applied to the input of a divider 16 having a variable division factor N. The output of the variable-sequence divider 16 being connected to the second input 12 of the discriminator 10 applies thereto the frequency F3 divider by N, or F3/N.

A frequency F2 is applied by way of a terminal 20 to an electronic counter 18 through a shaping circuit 19. The counter 18 counts the periods of the frequency F2 during successive intervals of equal duration $\Delta t$, regulated by a time base 17. The counter 18 presets the frequency divider 16 according to the value which it indicates at the end of each interval $\Delta t$; in other words, if the counter 18 indicates N at the end of a counting interval, the divider 16 furnishes at the output a pulse each time it has received from the terminal 15 N input pulses at frequency F3, i.e., it applies at input 12 a frequency equal to F3/N.

The control of the oscillator 14 by means of the phase discriminator 10 forces this oscillator to furnish a frequency F3 such that the frequencies on the two inputs 11 and 12 thereof are equal, as is well known in the art. The control system thus furnishes the relationship $F1 = F3/N$. In addition, due to the arrangement of time base 17, counter 18 and divider 16, $N = k \cdot F2$, $k$ being a constant which depends particularly upon the duration $\Delta t$ of the counting intervals. Therefore, the output frequency $F3$ has the value $F3 = k \cdot F1 \cdot F2$. In other words, $F3$ is proportional to the multiplication of frequency $F1$ and frequency $F2$.

Figure 2:
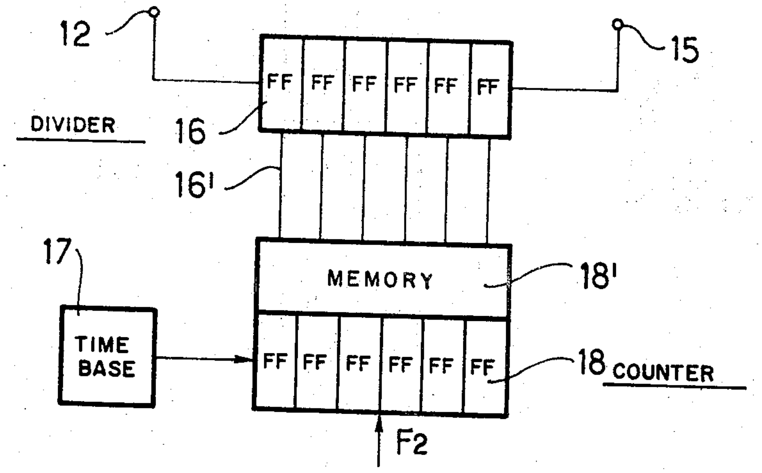
FIG. 2 is a more detailed schematic diagram of a portion of the diagram shown in FIG. 1.

FIG. 2 shows a means for presetting the variable divider 16 according to the value posted by the counter 18.

It is known to make up complete units 18—18' comprising a counter 18 and a memory 18' associated therewith, which stores the bits at each counting cycle and modifies only the bits which must be altered as a consequence of the variation of the quantity to be counted, in this case the frequency F2.

In order to establish the concepts of the invention, it will be assumed, in a simplified example that is, however, by no means limitative, that the counter 18 has a capacity of 64 with six binary flip-flops. In this case, the divider 16 consists also of a counter with six binary flip-flops, having an input 15 and an output 12 (see FIG. 1). The connections 16' symbolize a transfer in parallel of the bits contained in the memory 18' into the flip-flops of the divider 16.

If the divider 16 belongs to the "counting" type of circuit and if the memory posts a certain value lower than 64, for example $N = 41$, the memory will transfer in parallel into the divider 16 a condition or state complementary to its counting state or condition, i.e., $23 = (64 - N)$ in the example chosen. The divider 16 counting up and emitting an output pulse when it reaches its maximum count and returns to zero (full capacity) will thus effectively produce a division by N.

On the other hand, the divider 16 may be of the "count down" or reverse type. When in this case the memory posts the value N, it transfers in parallel into the divider 16 its counting state N. In the same manner as above, the divider N will count down to zero and thereby furnish at the output the frequency F3/N.

The operations of transfer in parallel of a value posted in a memory or register or its complement are well known in the art and therefore the conventional equipment which performs these operations need not be described herein in detail. It should also be understood that the divider function controlled by an electronic counter may be extended to any capacities whatsoever. There exist other processes to control a variable divider by means of a counter; for example, it is known to decrease the capcity of a counter by providing various combinations of binary flip-flops having different stages. Such combinations may be selectively effected by control of diodes or transistors whose conductive or non-conductive stage is controlled by the condition posted on the memory 18'.

The circuit according to FIG. 1 will be referred to hereinafter as circuit A, having terminals 11, 20 and 15.

Figure 3:
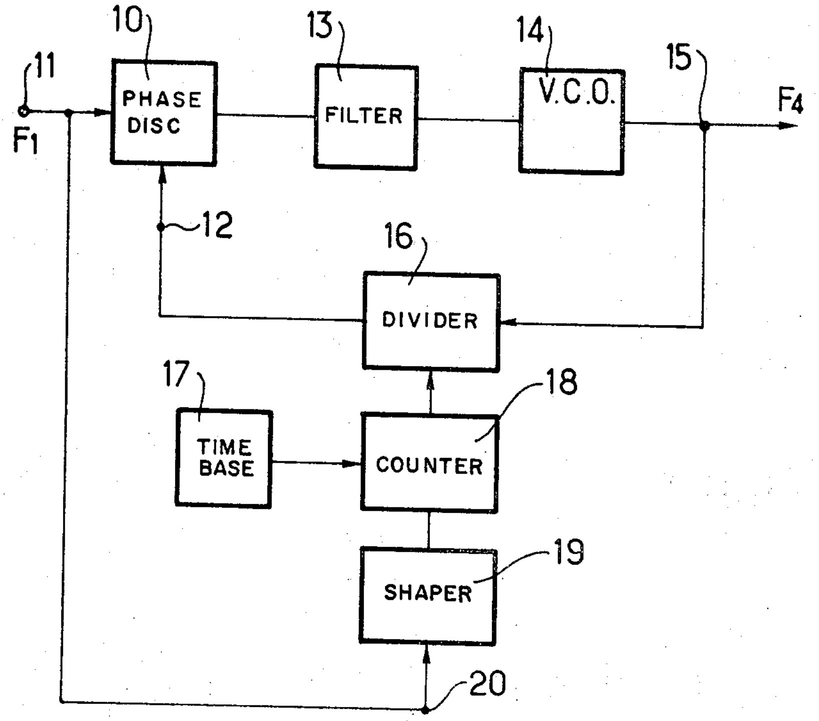
FIG. 3 is a schematic diagram of a modification of the circuit according to FIG. 1 furnishing an output frequency proportional to the square of the numeric value of an input frequency.

If the frequency F1 is applied at the same time to the terminal 11 and to the terminal 20 of the circuit A (FIG. 1), it is immediately apparent that a frequency $F4 = k \cdot (F1)^2$ will be obtained at the output. Such a circuit is illustrated in FIG. 3 and will hereinafter be identified as circuit B.

Figure 4:
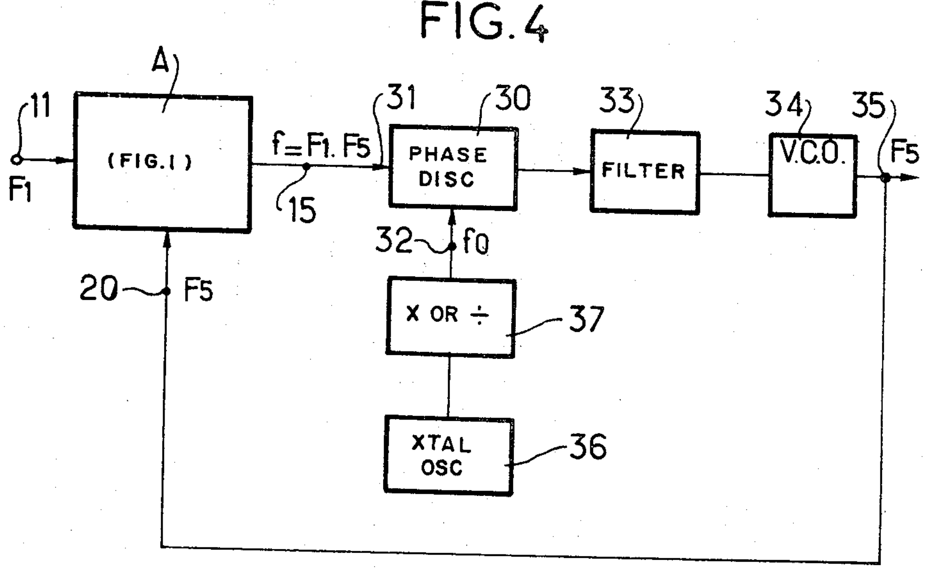
FIG. 4 is a schematic diagram of another modified embodiment providing a frequency proportional to the reverse of the numerical value of an input frequency.

FIG. 4 illustrates a circuit which comprises two parts: (1) A circuit of the type A mentioned above in connection with FIG. 1, receiving a frequency F1 on the input 11 thereof, a frequency F5 on the input 20 thereof, and furnishing due to the regulation system at terminal 15 a frequency f proportional to $F1 \cdot F5$. (2) The frequency $f$ is applied to one input 31 of a phase discriminator 30 which receives on the other input 32 thereof a frequency fo furnished by a fixed oscillator 36, the output of which is multiplied or divided in a member 37. The output signal of the phase discriminator 30 is applied through a passband filter 33 to a variable frequency oscillator 34 which is regulable by the applied input voltage and which furnishes on the output 35 thereof said frequency F5.

The second part of the device has the effect of imposing upon the frequency $f$ a constant value $f = fo$ (at a close constant). The controlling or regulating conditions of the device show that the frequency F5 on which the oscillator 34 is regulated cannot be precisely that which appears at terminal 15, i.e., the frequency $f = F1 \cdot F5$ (at a close constant). Thus, there will be obtained $F5 = k/F1$, wherein $k$ is a constant which depends principally on the frequency fo.

Figure 5:
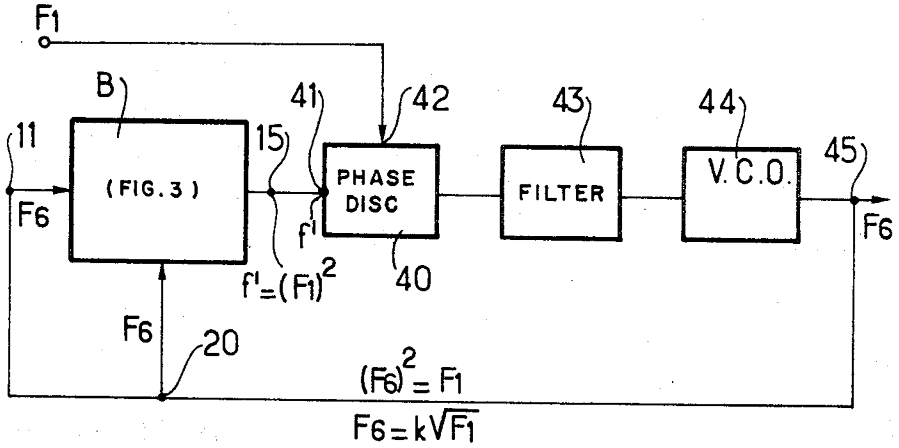
FIG. 5 is a schematic diagram of yet another modified embodiment providing a frequency proportional to the square root of the numeric value of an input frequency.

FIG. 5 illustrates a circuit which comprises two parts:

1. A circuit of the B type, as described in connection with FIG. 3, which receives on the inputs 11 and 20 thereof the same frequency F6.

2 The output 15 of the circuit B is connected to the input 41 of a phase discriminator 40, the other input 42 of which receives from the outside a frequency F1. The output of the phase discriminator 40 is connected through a passband filter 43 to an oscillator 44 regulated by the input voltage from filter 43 and which furnishes at terminal 45 a frequency F6 that is applied to the inputs 11 and 20 of the circuit B.

The frequency $f'$ which is applied at 41 is equal to $(F6)^2$ as a result of the circuit B. This frequency is rendered proportional to $F1$ by the closure of the loop 45–20. One obtains therefore the relation $(F6)^2 = k \cdot F1$, or also $F6 = k' \sqrt{F1}$ (by giving to $k$ any constant value whatsoever).

Figure 6:
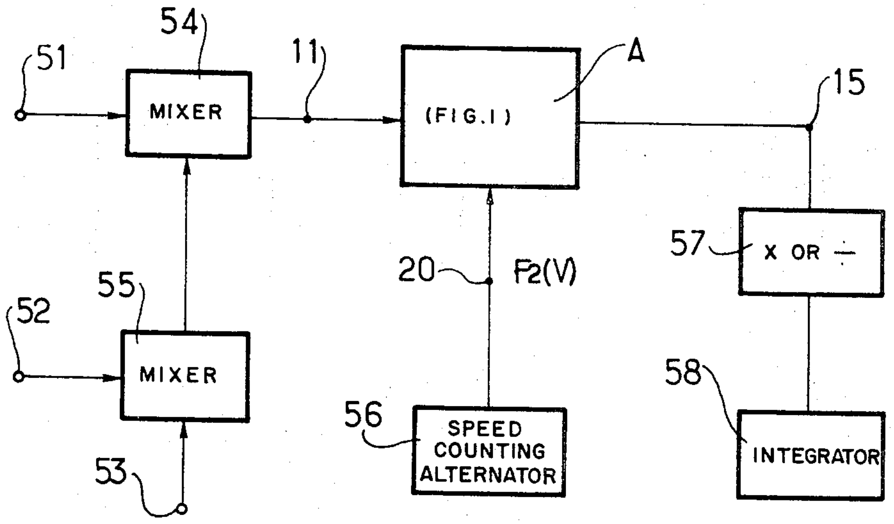
FIG. 6 is a schematic diagram showing an example of the application of the circuit according to FIG. 1 to a flow computer.

FIG. 6 illustrates a practical application of the circuit for multiplying frequencies, as proposed by the present invention, to an industrial flow computer, for example for controlling the flow of a conveyor belt. The instantaneous value of such a flow is equal to the product of the weight measured on a specific length of the band by the speed of this band.

It is known that such measurements can be carried out in the form of electric frequencies by means of appropriate sensors. In addition, the measurement of the speed may be obtained in frequency form by means of a speed-counting alternator of known construction.

The measurement of the weight in frequency form may be obtained, for example, by means of a transducer with vibrating cords. It is known to construct such transducers with a very small temperature deviation by virtue of the use of an appropriate alloy for the vibrating cords. It can be shown that such a transducer has a stability of zero and a sloping stability considerably better than the corresponding characteristics of the sensors with resistance gauges, for example.

An A type circuit, as described in connection with FIG. 1, receives on the terminal 11 thereof a frequency furnished at 51 by a sensor of the gross weight, corrected in a mixer 54 in accordance with a term furnished by another mixer 55, which receives at 52 a correction for the tare, and at 53 a correction for the temperature, for example, these two corrections being furnished by appropriate sensors which are known per se.

A speed-counting alternator 56 applies at terminal 20 a frequency proportional to the speed.

A frequency is obtained at terminal 15 which is proportional to the flow, which output may be received in a counter or integrator 58 after passage if desired into a divider or multiplier 57.

Figures 7, 8:
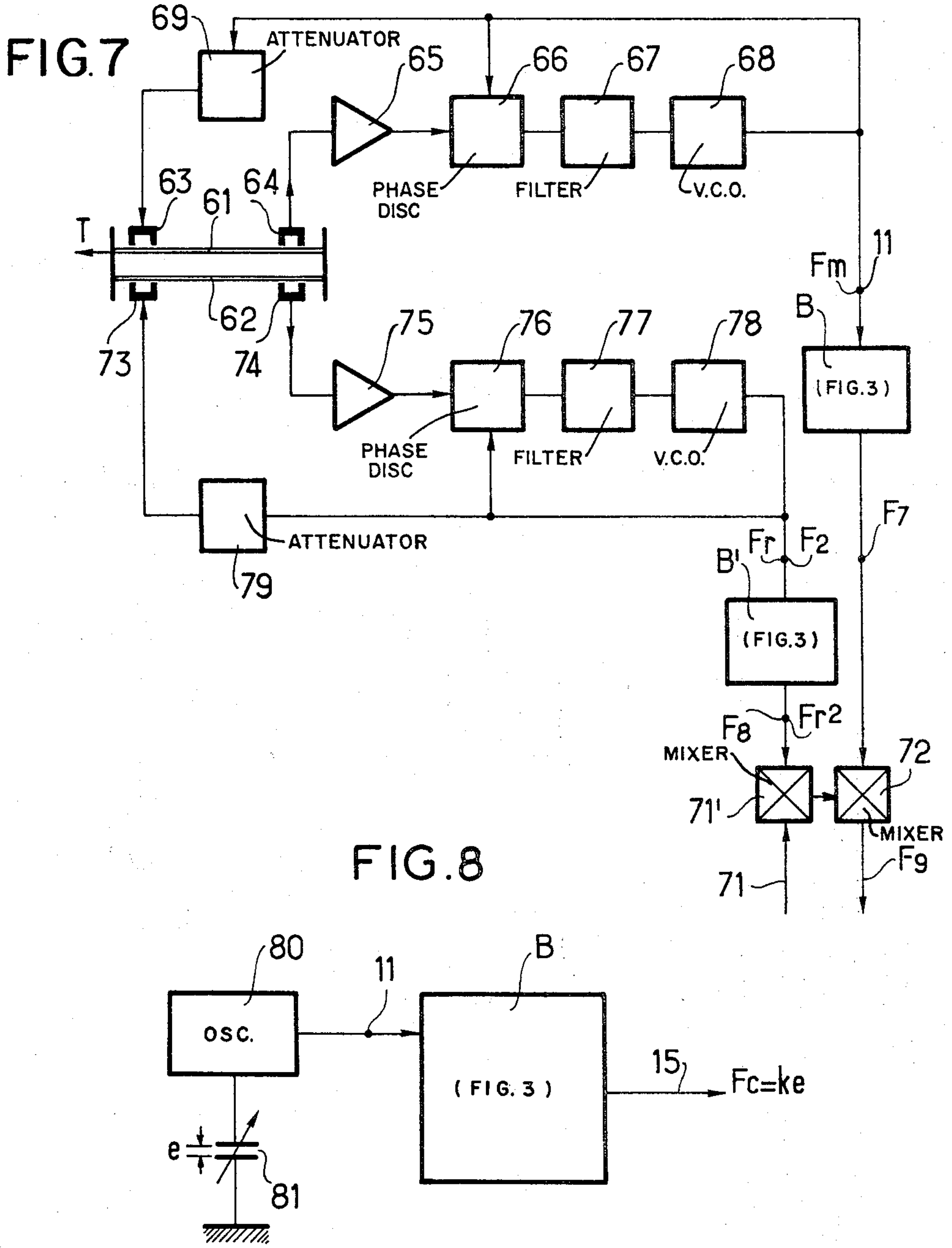
FIG. 7 is a schematic diagram of an example for the application of circuits according to FIG. 3 to a transducer.
FIG. 8 is a schematic diagram of an example of the application of a circuit according to FIG. 3 to an apparatus for measuring the distance between two objects, more particularly the electrodes of a capacitor.

FIG. 7 refers to the application of the B-type circuit referred to in FIG. 3 to the linearization of a transducer having vibrating cords, this apparatus having remarkable characteristics relating to precision, zero stability, and non-susceptibility to parasitic noises.

Such a transducer, subjected to a force T, produces a frequency which is proportional to the square root of the force T. By elevating this voltage to the square, there is obtained at the output a frequency which varies with the force.

In FIG. 7, the transducer with vibrating cords comprises a measuring cord 61 which is subjected to a force T to be measured, a reference rod 62, an exciting or energizing head 63 and a sensor head 64. The latter is connected with an amplifier 65 in series with one input of a phase discriminator 66 which is, in turn, connected in series with a passband filter 67 and an oscillator 68 controlled by the voltage. The output frequency Fm of oscillator 68 is applied, on the one hand, to an attenuating element 69 connected to the energizing head 63, and on the other hand to the phase discriminator 66 as well as to an input 11 of a B type circuit which furnishes at the output a frequency F7 which is proportional to the square of Fm, i.e., proportional to the force T applied to the cord 61.

On the other hand, the attenuating element 69 connected in series with the oscillator 68 and the energizing coil 63 is mounted in a manner such as to compensate strictly for the attenuation proper of the cord in vibration. The amplitude of the vibration of the cord 61 is thus maintained constant. It is evident that the same result may be obtained also with other methods.

An absolutely identical arrangement of elements 73 . . . 79 as the above-described elements 63 . . . 69 furnishes a frequency Fr which is squared in a type B circuit designated B'. The frequency F8 proportional to the force applied to the reference cord may receive a correction 71 in a mixer 71' and the corrected frequency 78 may be subtracted from the frequency F7 in a mixer 72 which produces at the output a frequency 79 proportional to the net force T.

FIG. 8 shows the application of a circuit according to the present invention, and specifically a B type circuit, to the generation of an output frequency *Fc* proportional to the spacing or distance between the lamellae of a capacitor, or, in a more general manner, to the distance between two capacitor electrodes which are adapted to be controlled or regulated relative to the spacing or distance between two objects of any kind, for example by means of a mechanical unit.

In FIG. 8, an oscillator 80 of any type — either LC or RC — furnishes a frequency F1 which, according to a well-known law, is inversely proportional to the square root of the capacitance C, i.e., which is within certain limits proportional to the distance e between the electrodes of a variable plane capacitor 81.

This may be written as: $F1 = k \sqrt{e}$

If the frequency F1 is applied to the input 11 of a B type circuit as proposed by the invention, there is obtained at the output a frequency $Fc = k \cdot (F1)^2 = k \cdot e$, wherein $k$ is a constnat of any given value, as hereinabove described. The frequency Fc is proportional to the distance $e$. It may be measured, recorded, and treated in a general manner by any known means.

This device thus furnishes with simple and reliable means a freuqency which is proportional to the distance between two objects and is susceptible to numerous practical applications.

What is claimed is:

1. A device for the parametric multiplication of frequencies providing an output frequency having a numeric value equal to the product of the numeric values of the input frequencies, comrpising a phase discriminator having first and second inputs, said first input receiving a first frequency signal, a voltage-controlled oscillator having its input connected to the output of said phase discriminator, a variable divider connecting the output of said voltage-controlled oscillator to the second input of said phase discriminator, and control means for controlling the division factor of said variable divider including a time base providing timing signals and counting means for counting in response to a second frequency signal during intervals controlled by said time base.

2. A device for the parametric multiplication of frequencies as defined in claim 1 wherein said counting means includes an electronic counter which is reset at intervals determined by said time base, said electronic counter receiving at the input thereof said second frequency signal, storage means for storing the value of the count at the end of each counting interval of said electronic counter, and means for transferring said count value to said variable divider.

3. A device for the parametric multiplication of frequencies as defined in claim 2 wherein said variable divider is a counter which is preset to the count value stored in said storage means.

4. A device for the parametric multiplication of frequencies as defined in claim 2 wherein said variable divider is a reverse counter which is preset to the complement of the count value stored in said storage means.

5. A device for the parametric multiplication of frequencies as defined in claim 1 wherein the first input of said phase discriminator is connected to the input of said counting means so that said first and second frequency signals are equal and the output frequency is equal to the square of said first input frequency.

6. A device for the parametric multiplication of frequencies as defined in claim 1, and further including means for providing a second output frequency which is the inverse of the frequency of said voltage-controlled oscillator comprising a second phase discriminator having one input connected to the output of said voltage-controlled oscillator, a fixed frequency oscillator connected to another input of said second phase discriminator and a second voltage-controlled oscillator connected to the output of said second phase discriminator, the output of said second voltage-controlled oscillator being connected to said counting means as said second frequency signal.

7. A device for the parametric multiplication of frequencies as defined in claim 5, and further including means for providing the square root of a third frequency signal in response to the output of said voltage-controlled oscillator comprising a second phase discriminator having a first input connected to the output of said voltage-controlled oscillator and a second input receiving said third frequency signal, and a second voltage-controlled oscillator having its input connected to the output of said second phase discriminator and its output connected to said counting means as said second frequency signal.

8. A device for the parametric multiplication of frequencies as defined in claim 1, and further including a first mixer having first and second inputs receiving respective parameter signals a second mixer having a first input receiving an additional parameter signal and a second input connected to the output of said first mixer, the output of said second mixer being connected to said first input of said phase discriminator as said first frequency signal, and means providing a further parameter signal to said counting means as said second frequency signal.

9. A device for the parametric multiplication of frequencies as defined in claim 5 further including force measuring means including at least one vibrating cord to which a force to be measured is applied and means for generating a measuring signal having a frequency proportional to the frequency of vibration of said cord which is proportional to the square root of the applied force, said measuring signal being applied to said first input of said phase discriminator means.

10. A device for the parametric multiplication of frequencies as defined in claim 5, further including a measuring oscillator including a capacitor having movable plates for adjusting the frequency of oscillation, the output of said measuring oscillator being connected to said first input of said phase discriminator.

* * * * *